United States Patent
Kaneko et al.

(10) Patent No.: US 10,135,082 B2
(45) Date of Patent: Nov. 20, 2018

(54) FUEL CELL SYSTEM AND CONTROL METHOD OF FUEL CELL SYSTEM

(71) Applicant: TOYOTA JIDOSHA KABUSHIKI KAISHA, Toyota-shi, Aichi-ken (JP)

(72) Inventors: Tomohiko Kaneko, Okazaki (JP); Yoshiaki Naganuma, Toyota (JP); Yutaka Tano, Toyota (JP); Yohei Okamoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 343 days.

(21) Appl. No.: 14/932,037

(22) Filed: Nov. 4, 2015

(65) Prior Publication Data
US 2016/0133974 A1 May 12, 2016

(30) Foreign Application Priority Data

Nov. 10, 2014 (JP) ................. 2014-228235

(51) Int. Cl.

| | |
|---|---|
| *H01M 8/04* | (2016.01) |
| *H01M 8/04992* | (2016.01) |
| *H01M 8/04858* | (2016.01) |
| *B60L 11/18* | (2006.01) |
| *H01M 8/04089* | (2016.01) |
| *H01M 8/0438* | (2016.01) |
| *H01M 8/04537* | (2016.01) |
| *H01M 8/04746* | (2016.01) |

(52) U.S. Cl.
CPC ..... *H01M 8/04992* (2013.01); *B60L 11/1881* (2013.01); *H01M 8/04089* (2013.01); *H01M 8/04395* (2013.01); *H01M 8/04574* (2013.01); *H01M 8/04753* (2013.01); *H01M 8/04895* (2013.01); *H01M 2220/20* (2013.01)

(58) Field of Classification Search
CPC ................. H01M 8/04089; H01M 8/04992
USPC .......................................... 429/466
See application file for complete search history.

(56) References Cited

U.S. PATENT DOCUMENTS

| | | |
|---|---|---|
| 7,670,700 B2 | 3/2010 | Imamura et al. |
| 2013/0288148 A1 | 10/2013 | Kazuno et al. |

FOREIGN PATENT DOCUMENTS

| | | |
|---|---|---|
| JP | 2013-191312 A | 9/2013 |
| JP | 2013-229270 A | 11/2013 |

*Primary Examiner* — Basia A Ridley
*Assistant Examiner* — James M Erwin
(74) *Attorney, Agent, or Firm* — Hunton Andrews Kurth LLP

(57) ABSTRACT

A fuel cell system includes: a fuel cell outputting a current; a supply unit supplying oxidant gas; a flow-amount measurement unit measuring a flow amount of the oxidant gas; and a controller that feed-back controls the supply unit such that a measured flow-amount value converges toward a target flow-amount value, wherein the controller determines an acceptable current value in accordance with the measured flow-amount value, restricts the current to the acceptable current value or less, controls the current in accordance with a requested current value of the fuel cell; and performs a changing-suppression processing, when a condition continues for a predetermined period, the condition including that a changing width of the requested current value is equal to or less than a first value and a difference between the requested current value and the acceptable current value is equal to or less than a second value.

5 Claims, 10 Drawing Sheets

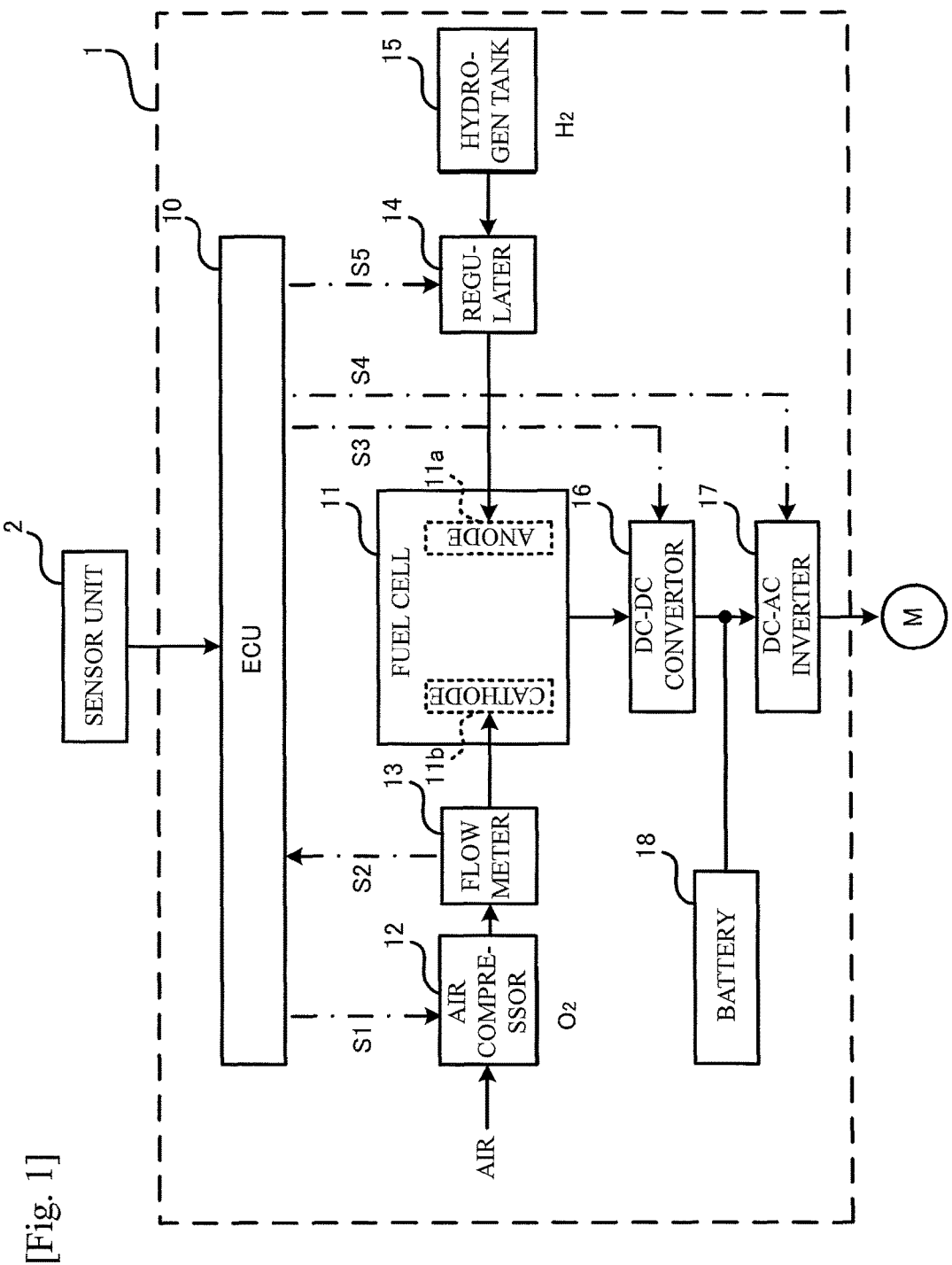
[Fig. 1]

[Fig. 2]
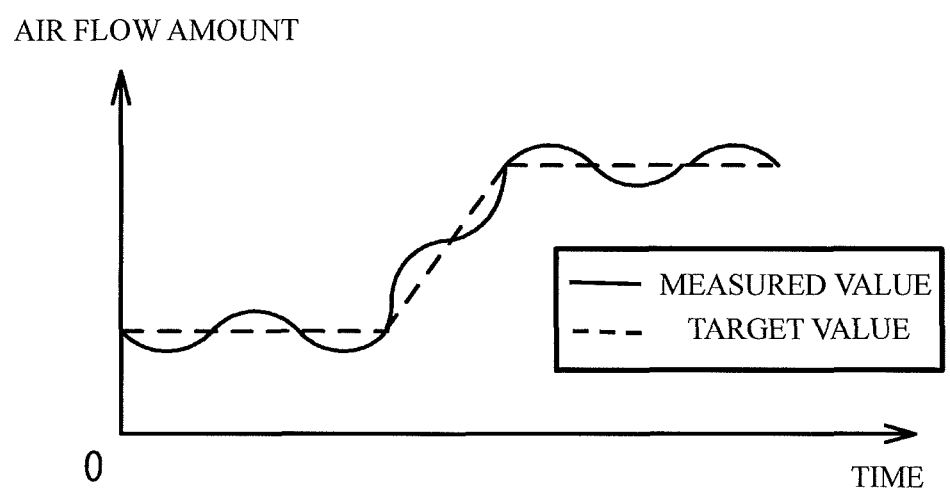

[Fig. 3]
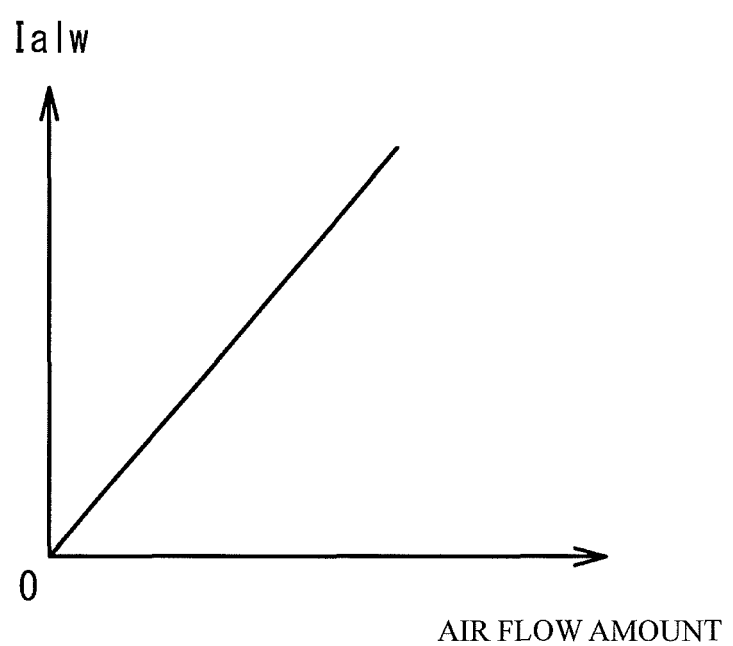

[Fig. 4A]
OUTPUT CURRENT DOES NOT FLUCTUATE.
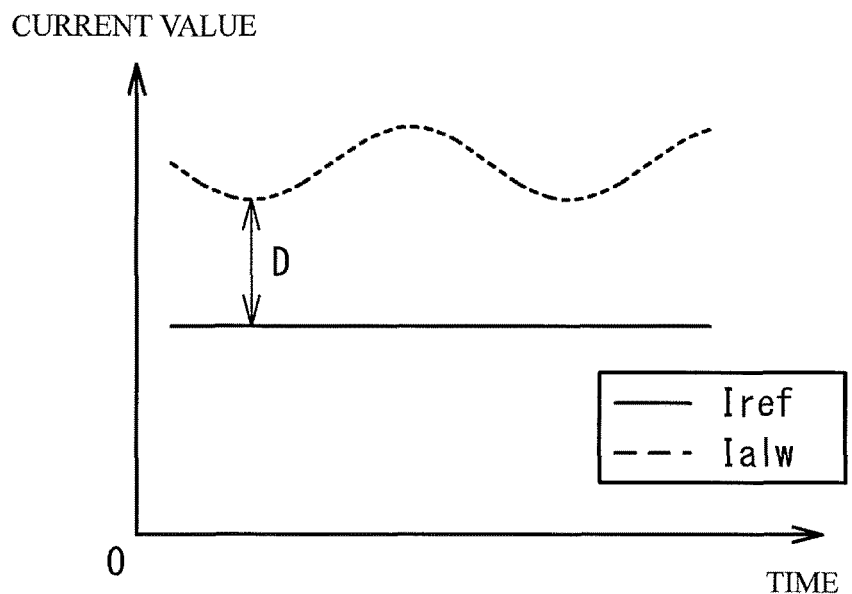
[Fig. 4B]
OUTPUT CURRENT FLUCTUATES.
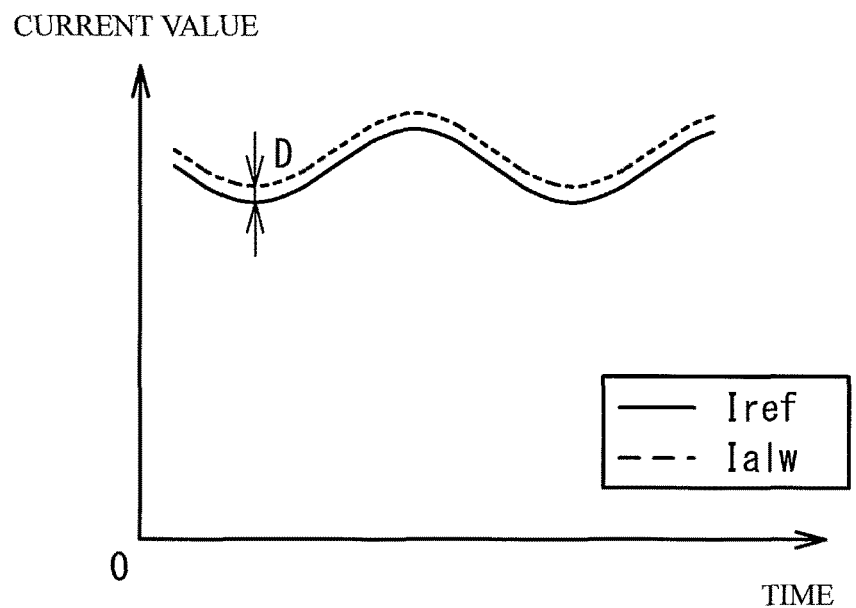

[Fig. 5]
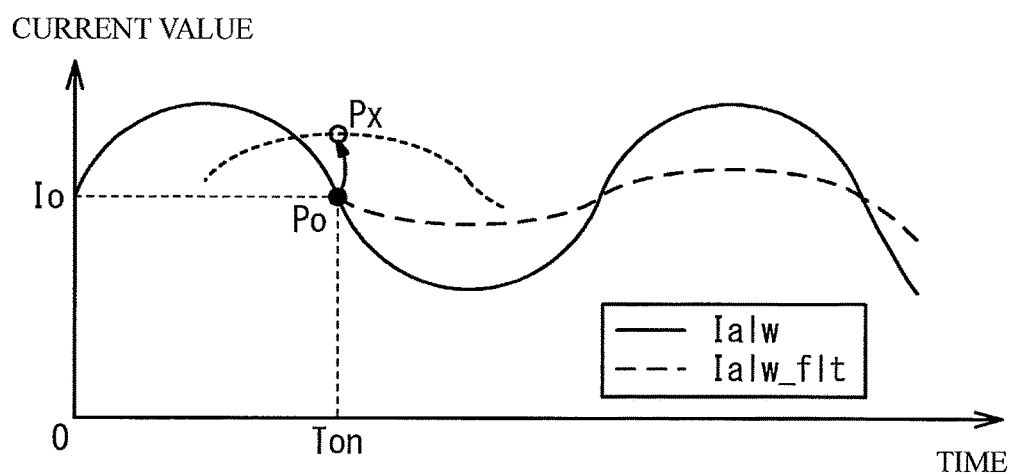

[Fig. 6]
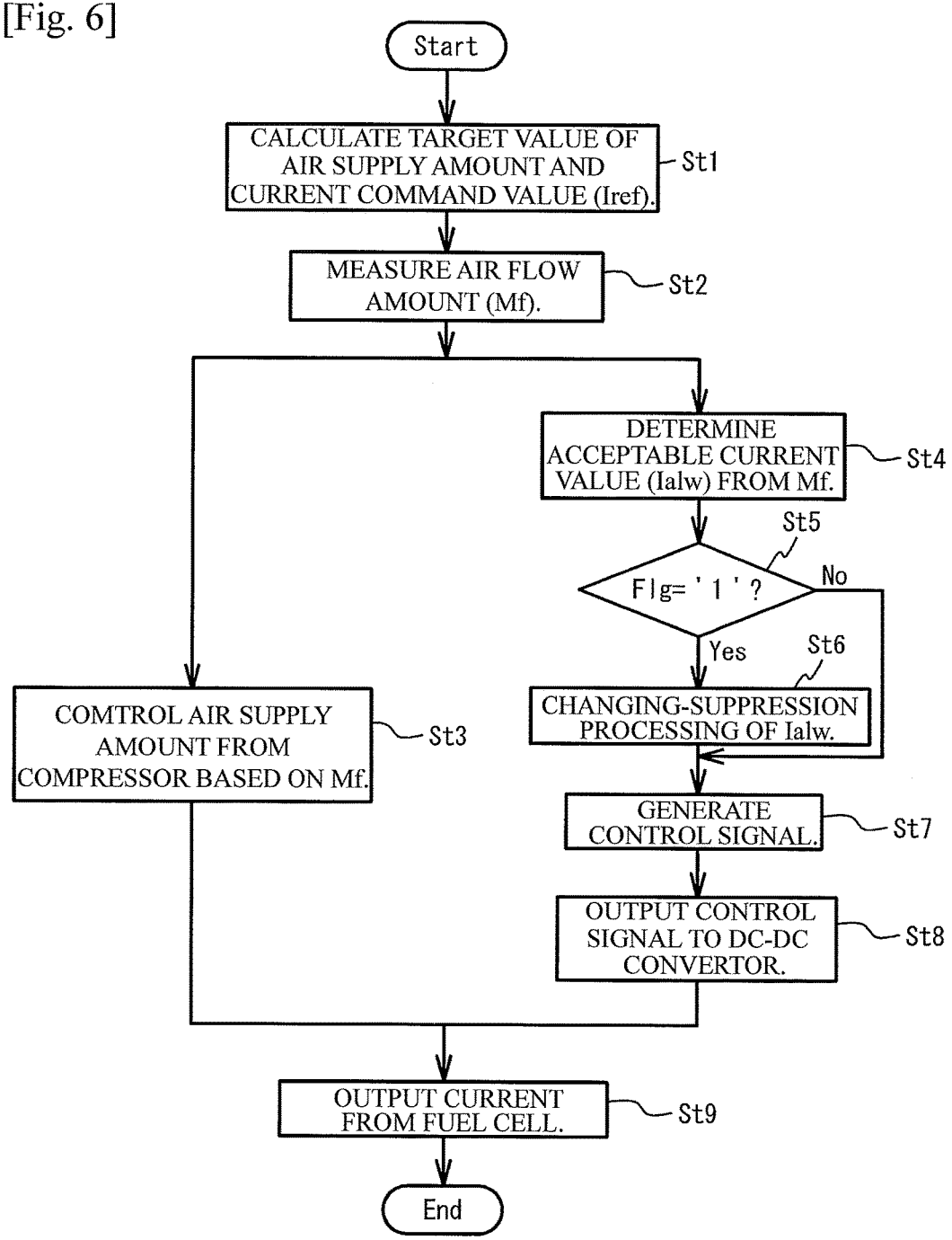

[Fig. 7]
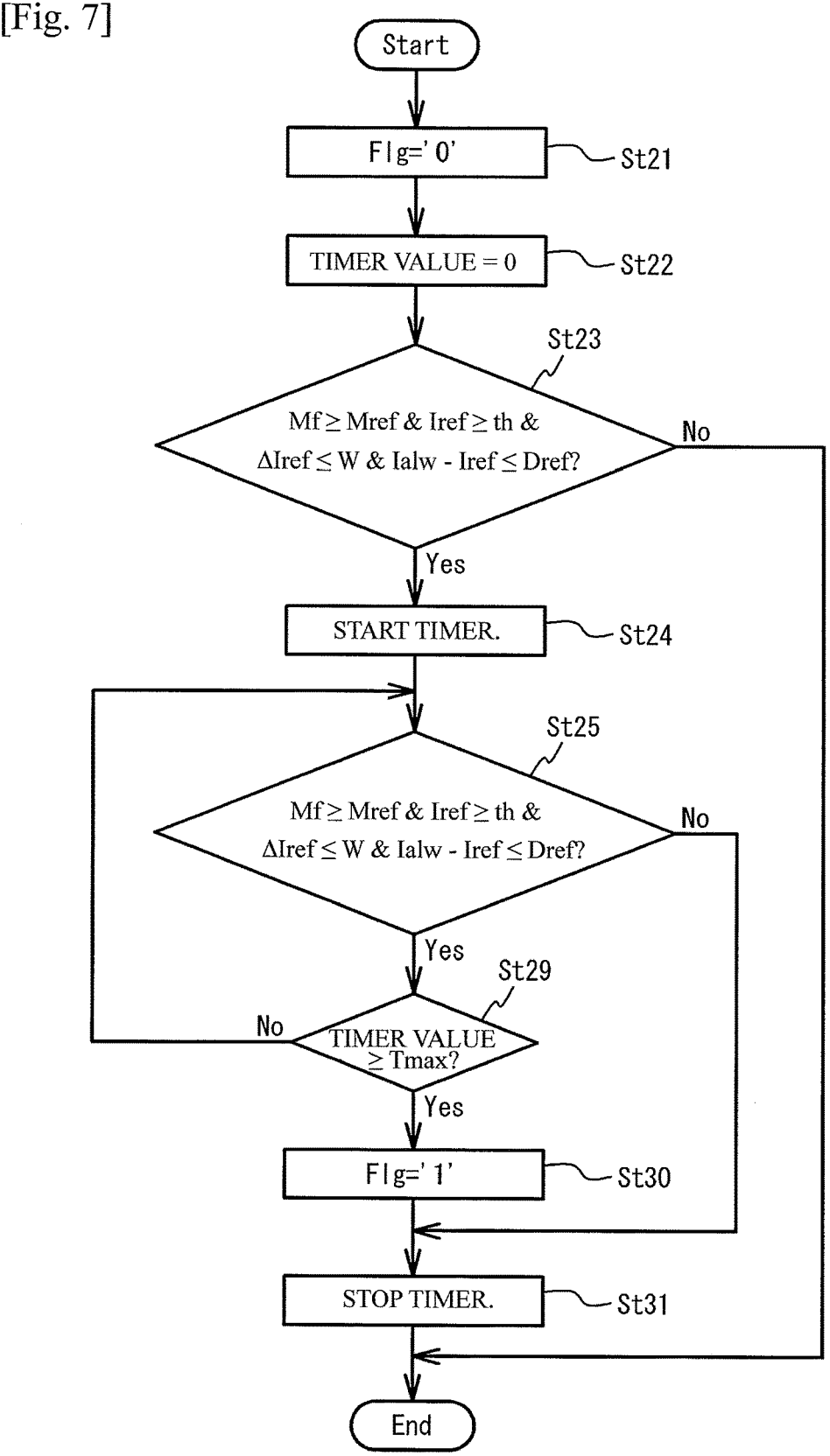

[Fig. 8]
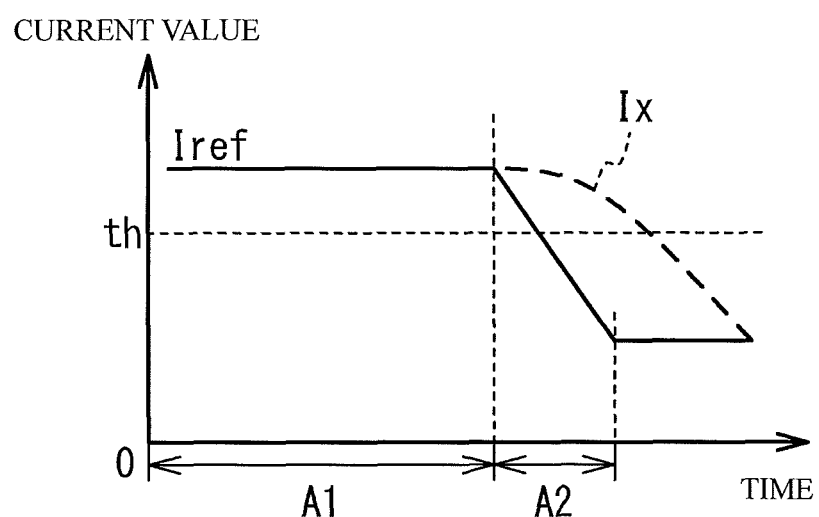

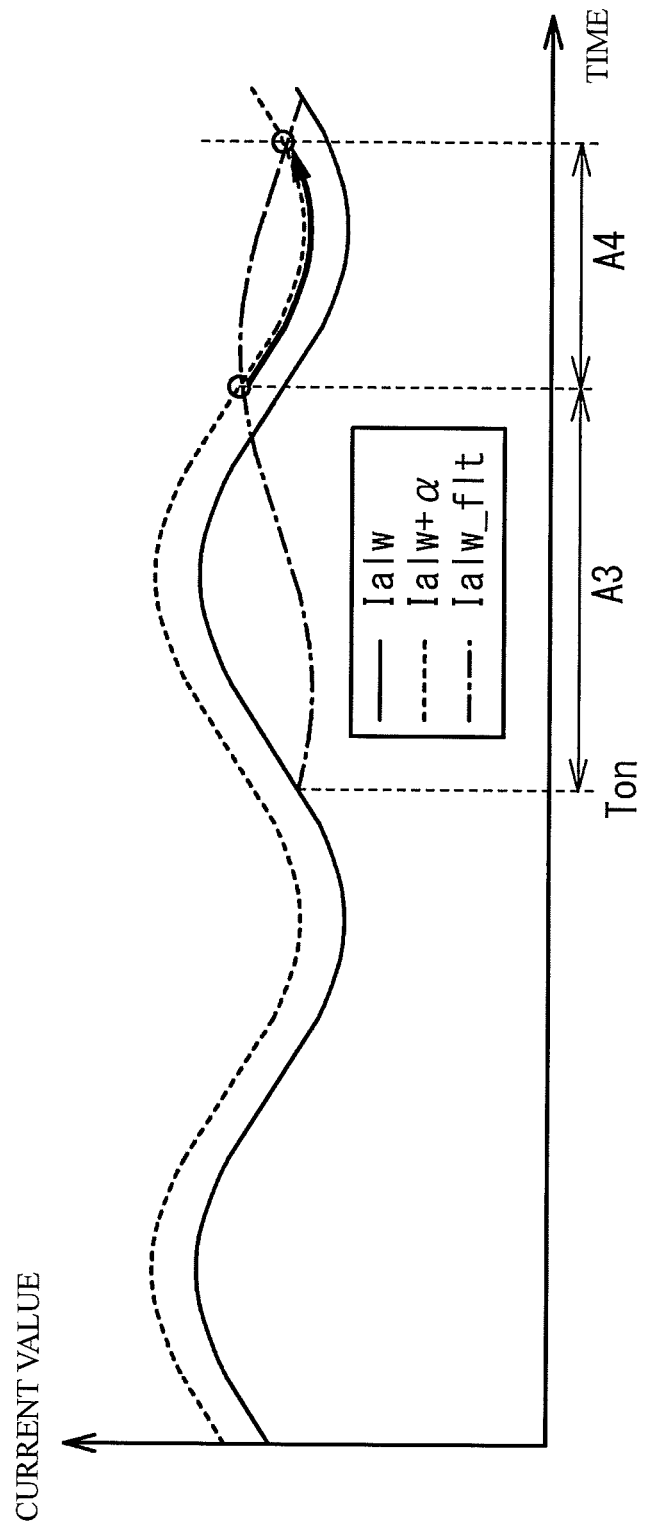
[Fig. 9]

[Fig. 10]
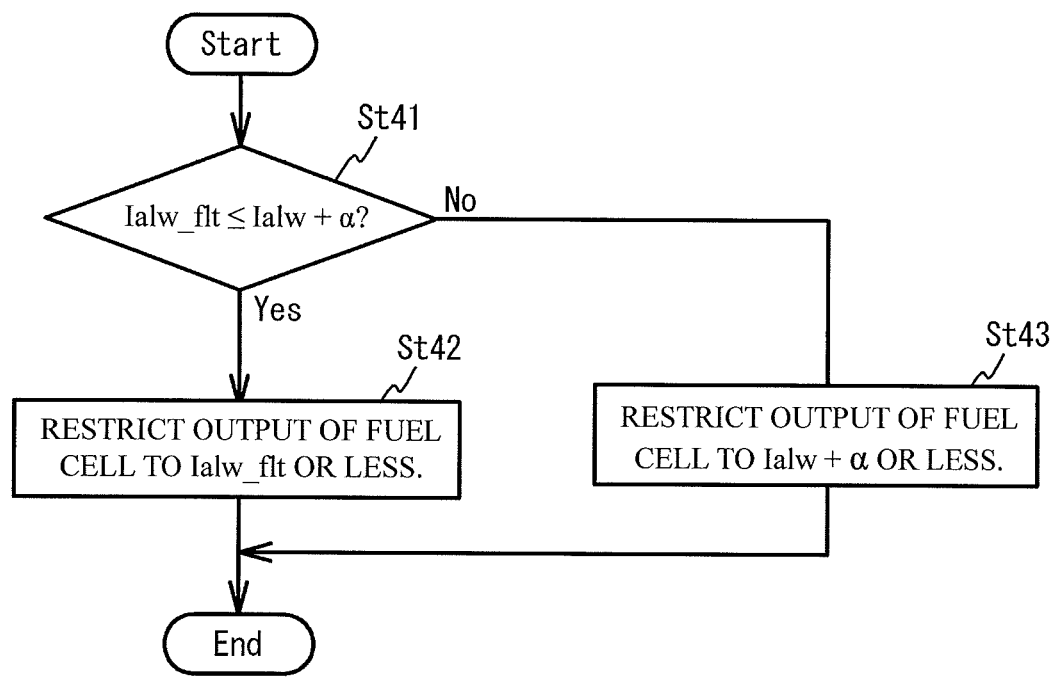

FUEL CELL SYSTEM AND CONTROL METHOD OF FUEL CELL SYSTEM

CROSS-REFERENCE TO RELATED APPLICATION

This application is based upon and claims the benefit of priority of the prior Japanese Patent Application No. 2014-228235, filed on Nov. 10, 2014, the entire contents of which are incorporated herein by reference.

FIELD OF THE INVENTION

The present invention relates to a fuel cell system and a control method of the fuel cell system.

BACKGROUND

Fuel cell vehicles (FCV) mounting a fuel cell are being noticed as new vehicles that are different from gasoline vehicles. The fuel cell generates electric power by a chemical reaction between hydrogen as fuel and air containing oxygen as oxidant and drives a motor.

With respect to the fuel cell, Japanese Patent Application Publication No. 2013-191312 discloses a physical quantity regarding electrical input quantity of a gas source is feed-back controlled to a normal value such that a flow amount of fuel gas detected by a gas flow meter coincides with a target gas flow amount.

SUMMARY OF THE INVENTION

It is an object of the present invention to provide a fuel cell system and a control method of a fuel cell system that reduces changing of driving torque of a vehicle.

According to an aspect of the present invention, there is provided a fuel cell system including: a fuel cell that outputs a current to a motor for driving a vehicle; a supply unit that supplies oxidant gas to the fuel cell; a flow-amount measurement unit that measures a flow amount of the oxidant gas from the supply unit; and a controller that feed-back controls the supply unit such that a measured flow-amount value of the flow-amount measurement unit converges toward a target flow-amount value, wherein: the controller determines an acceptable current value in accordance with the measured flow-amount value; the controller restricts the current output by the fuel cell to the acceptable current value or less, and controls the current in accordance with a requested current value of the fuel cell; and the controller performs a changing-suppression processing for reducing a changing width of the acceptable current value during a predetermined time, when a condition continues for a predetermined period, the condition including that a changing width of the requested current value during the predetermined time is equal to or less than a first predetermined value and a difference between the requested current value and the acceptable current value is equal to or less than a second predetermined value.

According to another aspect of the present invention, there is provided a control method of a fuel cell system, the method including: supplying oxidant gas to a fuel cell from a supply unit; measuring a flow amount of the oxidant gas from the supply unit by a flow-amount measurement unit; outputting a current from the fuel cell to a motor for driving a vehicle; feed-back controlling the supply unit such that a measured value of the flow-amount measurement unit converges toward a target flow-amount value; determining an acceptable current value in accordance with the measured flow-amount value; restricting the current output by the fuel cell to the acceptable current value or less and controlling the current in accordance with a requested current value of the fuel cell; and performing a changing-suppression processing for reducing a changing width of the acceptable current value during a predetermined time, when a condition continues for a predetermined period, the condition including that a changing width of the requested current value during the predetermined time is equal to a first predetermined value or less and a difference between the requested current value and the acceptable current value is equal to or less than a second predetermined value.

BRIEF DESCRIPTION OF THE DRAWINGS

FIG. 1 illustrates an example of a fuel cell system;

FIG. 2 illustrates a graph indicating an example of fluctuation of a measured value with respect to a target value;

FIG. 3 illustrates a graph indicating an example of an acceptable current value with respect to an air flow amount;

FIG. 4A and FIG. 4B illustrate a graph indicating an example of a relationship between a current command value and an acceptable value in a case where an output current does not fluctuate and in a case where the output current fluctuates;

FIG. 5 illustrates a graph indicating a changing-suppression processing of an acceptable value;

FIG. 6 illustrates a flowchart of an example of an operation of a fuel cell system;

FIG. 7 illustrates a flowchart indicating an example of a control processing of an execution flag after a changing-suppression process;

FIG. 8 illustrates a graph indicating an example of a changing of a current command value;

FIG. 9 illustrates an example of switching of an upper limit of an output current of a fuel cell; and FIG. 10 illustrates a flowchart of an example of a switching processing of an upper limit of an output current of a fuel cell.

DETAILED DESCRIPTION

A flow mount of oxidant gas provided to a fuel cell is feed-back controlled by an electrical control unit (ECU) or the like so as to converge toward a requested target value. Therefore, the flow amount of oxidant gas periodically fluctuates around the target value. An acceptable value of a current which the fuel cell can output, that is an upper limit, is determined in accordance with the flow amount of oxidant gas provided to the fuel cell. Therefore, when a load is large, the current that is output from the fuel cell to the motor fluctuates. With the fluctuation, the driving torque of the vehicle fluctuates.

FIG. 1 illustrates an example of a fuel cell system. A fuel cell system 1 is mounted on a vehicle such as a fuel cell vehicle and supplies electrical power to a motor for driving the vehicle. The fuel cell system 1 has an ECU 10, a fuel cell 11, an air compressor 12, a flow meter 13, a regulator 14, a hydrogen tank 15, a DC-DC convertor 16, a DC-AC inverter 17 and a battery 18.

The ECU 10 is an example of a controller and controls an operation of the fuel cell system 1. The ECU 10 has a processor such as a CPU (Central Processing Unit) and operates in accordance with a program that is read from a memory such as a ROM (Read Only Memory). The ECU 10 is not limited to the structure. The ECU 10 may be structured by only hardware.

The ECU 10 transmits signals S1, S3, S4 and S5 to the air compressor 12, the DC-DC convertor 16, the DC-AC inverter 17 and the regulator 14 in accordance with an input signal from a sensor unit 2. The sensor unit 2 has a plurality of sensors. The sensors are such as a gas pedal position sensor that detects an opening angle of a gas pedal of the vehicle (a degree of pressing).

The hydrogen tank 15, the regulator 14 and the fuel cell 11 are connected with a pipe in this order. The hydrogen tank 15 is an example of a supply device of hydrogen ($H_2$) used as fuel. The hydrogen tank 15 supplies the hydrogen to the fuel cell 11 via the regulator 14. The regulator 14 is, for example, a pressure regulation valve. The regulator 14 controls a supply amount of the hydrogen by adjusting an opening angle of the valve in accordance with the control signal S5 from the ECU 10.

The air compressor 12, the flow meter 13 and the fuel cell 11 are connected with a pipe in this order. The air compressor 12 is an example of a supply unit and supplies oxidant gas including oxygen ($O_2$) to the fuel cell 11. The air compressor 12 takes in air from outer side of the vehicle and pumps the air to the fuel cell 11 via the flow meter 13. In the embodiment, the air is an example of the oxidant gas. However, the oxidant gas is not limited to the air.

The flow meter 13 is an example of a flow-amount measurement unit and measures a flow amount of the air from the air compressor 12. The flow meter 13 outputs an information signal S2 indicating a measured value of the flow amount of the air to the ECU 10. The ECU 10 feed-back controls the air compressor 12 such that the measured value of the flow meter 13 converges toward a target value. The measured value is an example of a measured flow amount value. The target value is an example of a flow-amount target value.

The fuel cell 11 is a stack of a plurality of fuel cells that are electrically connected in series. The fuel cell 11 has an anode (fuel electrode) 11a to which the hydrogen acting as the fuel is supplied and a cathode (air electrode) 11b to which the air is supplied. The fuel cell 11 generates electrical power by performing a chemical reaction between the hydrogen and the oxygen. Thus, the fuel cell 11 outputs a current to the motor M for driving the vehicle.

The DC-DC convertor 16 includes pressure-rising-falling chopper circuit or the like and converts an output voltage and an output current of the fuel cell 11 in accordance with the control signal S3 output from the ECU 10. The DC-DC convertor 16 controls on-off of a plurality of switching elements such as a FET (Field Effect Transistor) provided in the pressure-rising-falling chopper circuit. Therefore, the output voltage and the output current of the fuel cell 11 are converted in accordance with a duty ratio of the control signal S3. An output current of the DC-DC convertor 16 is input into the DC-AC inverter 17.

The battery 18 acts as a storage of excessive electrical power, a storage of regenerative energy during a regenerative braking and an energy buffer during changing of load caused by acceleration and deceleration of the vehicle. The battery 18 may be a lithium secondary cell. The output current of the battery 18 is input into the DC-AC inverter 17.

The DC-AC inverter 17 converts direct current of the output current of the DC-DC convertor 16 and the battery 18 into a tri-phase current. The DC-AC inverter 17 converts the current based on a control method such as PWM (Pulse Width Modulation) when the on-off of the switching element is controlled in accordance with the control signal S4 output from the ECU 10. The output current of the DC-AC inverter 17 is output to the motor M for driving the vehicle.

In the fuel cell system of the embodiment, the ECU 10 calculates a target value of the supply amount of the air of the air compressor 12 in accordance with the input from the sensor unit 2 and feed-back controls the air compressor 12 such that the measured value of the flow meter 13 converges toward the target value. Therefore, the measured value of the flow meter 13 fluctuates near the target value.

FIG. 2 illustrates a graph indicating an example of fluctuation of the measured value with respect to the target value. In FIG. 2, a horizontal axis indicates time, and a vertical axis indicates the flow amount of the air. A solid line in the graph indicates the measured value of the flow meter 13. A dotted line indicates the target value.

The target value increases when a gas pedal of the vehicle is pressed. The feed-back control of the ECU 10 normally results in a periodical changing of the measured value near the target value such that the measured value converges toward the target value. In concrete, the ECU 10 increases the output of the air compressor 12 when the measured value is lower than the target value and decreases the output of the air compressor 12 when the measured value is higher than the target value. Therefore, the measured value follows the changing of the target value. After the measured value exceeds the target value, the measured value becomes lower than the target value. The processes are repeated.

The ECU 10 calculates a current command value Iref of the fuel cell 11 in accordance with the input from the sensor unit 2. The current command value Iref is an example of a required current value that is required for the fuel cell 11. The ECU 10 generates the control signal S3 of the DC-DC convertor 16 in accordance with the current command value Iref.

In this case, the ECU 10 determines an acceptable value Ialw of the output current of the fuel cell 11 in accordance with the flow amount of the air supplied to the fuel cell 11, and restricts the output current of the fuel cell 11 to a value that is equal to or less than the acceptable value Ialw. That is, the acceptable value Ialw is determined in accordance with the measured value of the flow meter 13 and is an upper limit value of the current that is extractable from the fuel cell 11. Therefore, the ECU 10 restricts the current command value Iref to the acceptable value Ialw or less. The acceptable value Ialw is an example of an acceptable current value.

FIG. 3 illustrates a graph indicating an example of the acceptable value Ialw of the current with respect to the flow amount of the air. For example, the acceptable value Ialw is determined so as to be proportional to the supply amount of the air. In concrete, the ECU 10 obtains a value in which a measured value of the flow meter 13 is multiplied by a predetermined proportionality coefficient and determines the value as the acceptable value Ialw.

In this manner, the ECU 10 determines the acceptable value Ialw in accordance with the measured value. The ECU 10 restricts the current output from the fuel cell 11 to the acceptable value Ialw or less and controls the current in accordance with the current command value Iref. Thus, reduction of the output voltage of the fuel cell 11 caused by lack of the supply amount of the air is suppressed. And, a current according to the current command value Iref is extracted from the fuel cell 11 and is input into the DC-DC convertor 16.

However, the measured value of the flow meter 13 fluctuates because of the feedback control of the ECU 10, as mentioned above. Therefore, the acceptable value Ialw similarly fluctuates. Accordingly, when the ECU 10 uses the acceptable value Ialw for the current control, the output current of the fuel cell 11 may fluctuate as described later.

FIG. 4A and FIG. 4B illustrate a graph indicating an example of a relationship between the current command value Iref and the acceptable value Ialw in a case where the output current does not fluctuate and in a case where the output current fluctuate. In FIG. 4A and FIG. 4B, a horizontal axis indicates time, and a vertical axis indicates a current value. A solid line indicates the current command value Iref (output current value). A dotted line indicates the acceptable value Ialw.

As illustrated in FIG. 4A, when a difference D between the current command value Iref and the acceptable value Ialw is sufficiently large, the acceptable value Ialw does not influence on the output current of the fuel cell 11. Therefore, the output current of the fuel cell 11 does not fluctuate.

On the other hand, as illustrated in FIG. 4B, when the difference D between the current command value Iref and the acceptable value Ialw is small, the output current of the fuel cell 11 fluctuate when the current command value Iref is subjected to the restriction of the acceptable value Ialw. Therefore, during a high load phase where a high current command value Iref is given (for example, when the vehicle is accelerated with full gas pedal), there is a problem that the current that is output from the fuel cell 11 to the motor M fluctuates and, in association with this, the driving torque of the vehicle fluctuates.

And so, when the ECU 10 detects a phase where the driving torque may fluctuate, the ECU 10 performs a changing-suppression processing in which a changing width of the acceptable value Ialw is reduced.

FIG. 5 illustrates a graph indicating the changing-suppression processing of the acceptable value Ialw. In FIG. 5, a horizontal axis indicates time, and a vertical axis indicates a current value. A solid line indicates the acceptable value Ialw before the changing-suppression processing. A dotted line indicates the acceptable value Ialw_flt after the changing-suppression processing.

The ECU 10 detects that a condition of the changing-suppression processing described later is satisfied at a time Ton. After that, the ECU 10 starts the changing-suppression processing of the acceptable value Ialw. Amplitude of the acceptable value Ialw_flt after the changing-suppression processing is smaller than that of the acceptable value Ialw before the changing-suppression processing. Therefore, the changing width is reduced. There are an n-th order filter (n: a positive integer) and a rate processing as the changing-suppression processing.

When the ECU 10 uses the n-th order filter, it is preferable that the ECU 10 performs the changing-suppression processing in which a present value of the acceptable value Ialw is used as an initial value with respect to the acceptable value Ialw such that a continuity of the acceptable values Ialw and Ialw_flt is maintained before and after the changing-suppression processing. That is, the ECU 10 obtains a value Io (see a code Po) of the acceptable value Ialw at a starting time Ton, and starts a filtering processing in which the value Io is used as an initial value. The value Io is an example of the acceptable value Ialw at a starting of the changing-suppression processing.

Thus, the continuity of the acceptable values Ialw and Ialw_flt is maintained before and after the changing-suppression processing. On the other hand, when the changing-suppression processing is constantly performed from the time Ton or before at which the condition of the changing-suppression processing is satisfied, there is a case where a value of the acceptable value Ialw_flt after the changing-suppression processing at the time Ton is far from a value of the acceptable value Ialw before the changing-suppression processing (see the code Po) as indicated by the code Px. In this case, the acceptable values Ialw_flt and Ialw greatly changes before and after the time Ton. Therefore, the acceptable values Ialw_flt and Ialw may influence on the driving torque of the motor M.

In this manner, the ECU 10 reduces the changing of the output current of the fuel cell 11 by performing the changing-suppression processing for reducing the changing width of the acceptable value Ialw. Thus, the changing of the driving torque of the vehicle is reduced. However, the changing-suppression processing of the acceptable value Ialw is unconditionally performed, the acceptable value may influence on the operation of the vehicle. Therefore, in the fuel cell system 1 of the embodiment, only when a condition described later is satisfied, the changing-suppression processing of the acceptable Ialw is performed. A description will be given of the operation of the fuel cell system 1 in detail.

FIG. 6 illustrates a flowchart of an example of the operation of the fuel cell system 1. The ECU 10 calculates a target value of the supply amount of the air of the air compressor 12 and the current command value Iref (Step St1) based on the input from the sensor unit 2. The EUC 10 stores the target value of the supply amount of the air and the current command value according to the input parameters from the sensor unit 2 as a table in advance. The ECU 10 may obtain the target value of the supply amount of the air and the current command value Iref by reading the table.

Next, the flow meter 13 measures a flow amount Mf of the air from the air compressor 12 (Step St2). The flow amount Mf (measured value) of the air is given to the ECU 10 as an information signal S2.

The process of the Step St3 and the sequence of the processes of the steps St4 to St8 are performed in parallel. A description will be given of the process of the step St3. After that, a description will be given of the sequence of the processes of the steps St4 to St8.

The ECU 10 controls the air compressor 12 based on the flow amount Mf of the air (Step St3). That is, the ECU 10 feed-back controls the air compressor 12 such that the measured value measured by the flow meter 13 converges toward the target value.

In concrete, the ECU 10 puts the value according to the difference between the target value and the measured value into the control signal S1 and gives the control signal S1 to the air compressor 12. Thus, in accordance with the target value, the air compressor 12 supplies the air to the fuel cell 11.

The ECU 10 determines the acceptable value Ialw of the output current of the fuel cell 11 in accordance with the flow amount Mf of the air (Step St4). As mentioned above, the ECU 10 determines the acceptable value Ialw based on the relationship illustrated in FIG. 3.

Next, the ECU 10 determines whether an execution flag Flg of the changing-suppression processing is "1" (Step St5). As described later, the ECU 10 periodically performs the control processing of the execution flag Flg.

The ECU 10 performs the changing-suppression processing for reducing the changing width of the acceptable value Ialw when the execution flag Flg='1' (Yes in Step St5). On the other hand, when the execution flag Flg='0' (No in Step St5), the ECU 10 does not perform the changing-suppression processing.

Next, the ECU 10 generates the control signal S3 based on the current command value Iref and the acceptable value Ialw (Ialw_fit) (Step St7). In concrete, the ECU 10 generates the control signal S3 of the duty ratio according to the current command value Iref. In this case, the ECU 10 matches the current command value Iref with the acceptable value Ialw (Ialw_fit) and generates the control signal S3 when the current command value Iref is larger than the acceptable value Ialw (Ialw_fit).

Next, the ECU 10 outputs the control signal S3 to the DC-DC convertor 16 (Step St8). That is, the ECU 10 restricts the current output from the fuel cell 11 to the acceptable value Ialw or less according to the measured value of the flow meter 13 and controls the current in accordance with the current command value Iref with respect to the fuel cell 11.

Next, the fuel cell 11 outputs the current to the motor M (Step St9). In this manner, the fuel cell system 1 operates.

FIG. 7 illustrates a flowchart indicating an example of the control processing of the execution flag Flg after the changing-suppression processing. In the process, the ECU 10 detects with a timer that the condition in which a plurality of conditions are satisfied continues for a predetermined time. The processing is periodically performed. Every time the processing is performed, the execution flag Flg is updated.

The ECU 10 initializes the execution flag Flg into "0" (Step St21). Next, the ECU 10 initializes the timer value into "0" (Step St22). Next, the ECU 10 determines whether the following conditions (1) to (4) are satisfied (Step St23). A description will be given of the condition determination.

$$Mf \geq Mref \quad (1)$$

$$Iref \geq th \quad (2)$$

$$\Delta Iref \leq W \quad (3)$$

$$Ialw - Iref \leq Dref \quad (4)$$

With respect to the condition of the formula (1), the ECU 10 determines whether the flow amount Mf of the air from the air compressor 12, that is the measured value of the flow meter 13, is equal to a predetermined value Mref (a third predetermined value) or more. Thus, the ECU 10 determines whether a sufficient amount of the air is supplied to the fuel cell 11.

When the sufficient amount of the air is not supplied, it is determined that the fuel cell 11 is performing an intermittent operation or it is determined that the fuel cell 11 has just finished the intermittent operation. In this phase, the output current of the fuel cell 11 is much smaller than during the normal operation. Therefore, the ECU 10 does not perform the changing-suppression processing.

With respect to the condition of the formula (2), the ECU 10 determines whether the current command value Iref is equal to or larger than a threshold th (a fourth predetermined value). Thus, the ECU 10 determines high or low of the load of the fuel cell 11.

When the load is low, the output current of the fuel cell 11 is low. Therefore, the fluctuation of the driving torque caused by the fluctuation of the output current is also low. When the load is low, the output current of the battery 18 is input into the motor M as an adjunct. Therefore, the fluctuation of the output current of the fuel cell 11 is canceled. And, the driving torque is stabilized. Therefore, in this case, the ECU 10 does not perform the changing-suppression processing.

With respect to the condition of the formula (3), the ECU 10 determines whether the changing width $\Delta Iref$ of the current command value Iref is equal to or less than a predetermined value W (a first predetermined value). Thus, the ECU 10 determines existence or non-existence of the rapid changing of the current command value Iref. The changing width $\Delta Iref$ is calculated as a difference between a previously obtained value and a currently obtained value when the current command value Iref is obtained at a time interval. That is, the ECU 10 determines whether the changing width $\Delta Iref$ of the current command value during a predetermined time is equal to or less than the predetermined value W.

FIG. 8 illustrates a graph indicating an example of the changing of the current command value Iref. In FIG. 8, a horizontal axis indicates time, and a vertical axis indicates a current value.

The current command value Iref is maintained at a constant value that is equal to or higher than the threshold th during a period A1. However, the current command value Iref decreases during a next period A2. In this case, when the ECU 10 performs the changing-suppression processing of the acceptable value Ialw, the reduction degree of the current command value Iref is reduced as indicated by the code Ix. Therefore, speed reduction of the vehicle is influenced. Therefore, in this case, the ECU 10 does not perform the changing-suppression processing. That is, the ECU 10 performs the changing-suppression processing when the command value of the speed of the vehicle is constant.

With respect to the condition of the formula (4), the ECU 10 determines whether the difference (Ialw−Iref) between the acceptable value Ialw and the current command value Iref is equal to or less than a predetermined value Dref (a second predetermined value). Thus, the ECU 10 determines whether the current command value Iref is not in the transient state and is a value near the acceptable value Ialw as illustrated in FIG. 4B.

As mentioned above, when the difference between the acceptable value Ialw and the current command value Ialw is sufficiently large (see FIG. 4A), the driving torque does not fluctuate. Therefore, in this case, the ECU 10 does not perform the changing-suppression processing.

The ECU 10 terminates the process when at least one of the conditions indicated by the formulas (1) to (4) (No in Step St23) is not satisfied. On the other hand, when all of the conditions indicated by the formulas (1) to (4) are satisfied (Yes in Step St23), the ECU 10 starts a timer (Step St24). That is, the ECU 10 starts timekeeper.

Next, the ECU 10 determines whether all of the conditions indicated by the formulas (1) to (4) are satisfied as well as Step St23 (Step St25). The ECU 10 stops the timer (Step St31) and terminates the process, when at least one of the conditions indicated by the formulas (1) to (4) is not satisfied (No in Step St25). On the other hand, when all of the conditions indicated by the formulas (1) to (4) (Yes in Step St25), the ECU 10 determines whether the timer value reaches a predetermined value Tmax (Step St29).

The ECU 10 performs the determination processing of Step St25 again, when the timer value does not reach the predetermined value Tmax (No in Step St29). On the other hand, when the timer value reaches the predetermined value Tmax (Yes in Step St29), the ECU 10 sets the execution flag Flg to "1" (Step St30).

That is, the ECU 10 sets the execution flag Flg to "1", when the state where each of the conditions of Step St25 is satisfied continues for a predetermined period until the timer value reaches the predetermined value Tmax. Therefore, the ECU 10 performs the changing-suppression processing for reducing a changing width of the acceptable value for a predetermined time in Step St16 of FIG. 6 when a state continues for a predetermined period. The state includes that the changing width of the current command value Iref during the predetermined time is equal to or less than the predetermined value W, the difference between the current command value Iref and the acceptable value Ialw is equal to or less than the predetermined value Dref, the measured value of the flow meter 13 is larger than a predetermined value Mref, and the current command value Iref is equal to or more than the threshold th.

Therefore, the ECU 10 performs the changing-suppression processing after determining a state where the changing-suppression processing is needed. The order of the determination processes of the conditions indicated by Steps St23 and St25 is not limited.

Next, the ECU 10 stops the timer (Step St31), and terminates the process. In this manner, the control process of the execution flag Flg of the changing-suppression processing is performed. When the changing of the acceptable value Ialw greatly influences on the driving torque of the vehicle even if the output current of the fuel cell 11 is low, the ECU 10 may omit the determination of the conditions (1) and (2) in Steps St23 and St25.

When the changing-suppression processing is performed, the acceptable value Ialw_flt after the changing-suppression processing may be larger than the acceptable value Ialw before the changing-suppression processing. In this case, when the acceptable value Ialw after the changing-suppression processing is excessively larger than the acceptable value Ialw_flt before the changing-suppression processing, a large current that does not correspond to the supply amount of the air is requested for the fuel cell 11. Therefore, the state where the acceptable value Ialw_flt is larger than the acceptable value Ialw is not preferable.

And so, during the changing-suppression processing, it is preferable that the ECU 10 restricts the current output from the fuel cell 11 to a smaller value or less of a value in which a predetermined value a is added to the acceptable value Ialw before the changing-suppression processing (hereinafter referred to as a corrected value) and the acceptable value Ialw_flt after the changing-suppression processing. In this case, the ECU 10 switches the upper limit of the output current of the fuel cell 11 between a corrected value (Ialw+$\alpha$) of the acceptable value Ialw before the changing-suppression processing and the acceptable value Ialw_flt after the changing-suppression processing.

FIG. 9 illustrates an example of switching of the upper limit of the output current of the fuel cell 11. In FIG. 9, a horizontal axis indicates time, and a vertical axis indicates a current value. A solid line indicates the acceptable value Ialw before the changing-suppression processing. A dotted line indicates the corrected value (Ialw+$\alpha$) of the acceptable value Ialw after the changing-suppression processing. A dashed-dotted line indicates the acceptable value Ialw_flt after the changing-reduction processing. The time Ton indicates a starting time of the changing-suppression processing.

During a period A3 after the starting time Ton, the acceptable value Ialw_flt after the changing-suppression processing is lower than the corrected value of the acceptable value Ialw. Therefore, the ECU 10 restricts the output current of the fuel cell 11 to the acceptable value Ialw_flt after the changing-suppression processing or less. However, during a next period A4, the acceptable value Ialw_flt after the changing-suppression processing is larger than the corrected value of the acceptable value Ialw. Therefore, as indicated by an arrow, the output current of the fuel cell 11 is restricted to the corrected value of the acceptable value Ialw or less. Thus, the current value requested for the fuel cell 11 is reduced.

FIG. 10 illustrates a flowchart of an example of a switching processing of the upper limit of the output current of the fuel cell 11. For example, the processing is executed in the generation processing (Step St7) of the control signal S3 illustrated in FIG. 6.

The ECU 10 compares the corrected value (Ialw+$\alpha$) of the acceptable value Ialw before the changing-suppression processing with the acceptable value Ialw_flt after the changing-suppression processing (Step St41). The ECU 10 restricts the output current of the fuel cell 11 to the acceptable value Ialw_flt after the changing-suppression processing or less (Step St42), when Ialw_flt≤Ialw+$\alpha$ is satisfied (Yes in Step St41). That is, the ECU 10 restricts the current output from the fuel cell 11 to the acceptable value Ialw_flt after the changing-suppression processing or less, when the acceptable value Ialw_flt after the changing-suppression processing is equal to or less than a value in which the predetermined value a is added to the acceptable value Ialw before the changing-suppression processing.

On the other hand, when Ialw_flt>Ialw+$\alpha$ is satisfied (No in Step St41), the ECU 10 restricts the output current of the fuel cell 11 to the corrected value of the acceptable value Ialw before the changing-suppression processing or less (Step St43). That is, the ECU 10 restricts the current output from the fuel cell 11 to a value, in which the predetermined value a is added to the acceptable value Ialw before the changing-suppression processing or less than the value, when the acceptable value Ialw_flt after the changing-suppression processing is larger than the value in which the predetermined value a is added to the acceptable value Ialw before the changing-suppression processing. In this manner, the upper limit of the output current of the fuel cell 11 is switched.

The ECU 10 generates the control signal S3 in accordance with the upper limit determined by the above-mentioned processing, and outputs the control signal S3 to the DC-DC convertor 16. Thus, the output current of the fuel cell 11 is reduced.

As mentioned above, the fuel cell system 1 has the fuel cell 11, the air compressor 12, the flow meter 13 and the ECU 10. The fuel cell 11 outputs the current to the motor M for driving the vehicle. The air compressor 12 supplies the air to the fuel cell 11.

The flow meter 13 measures the flow amount of the air from the air compressor 12. The ECU 10 feed-back controls the air compressor 12 such that the measured value of the flow meter 13 converges toward the target value. The ECU 10 determines the acceptable value Ialw in accordance with the measured value, restricts the current output from the fuel cell 11 to the acceptable value Ialw or less, and performs a processing in which the output current is controlled in accordance with the current command value Iref with respect to the fuel cell 11.

The ECU 10 performs the changing-suppression processing for reducing the changing width of the acceptable value Ialw during a predetermined time, when the condition that the changing width of the current command value Iref during the predetermined time is equal to or less than the predetermined value W and the difference between the current command value Iref and the acceptable value Ialw is equal to or less than the predetermined value Dref continues for a predetermined period.

With the above-mentioned structure, the ECU 10 feedback controls the air compressor 12 such that the measured value of the flow meter 13 converges toward the target value. Therefore, the measured value fluctuates.

The ECU 10 restricts the output current of the fuel cell 11 to the acceptable value Ialw according to the measured value or less than the acceptable value Ialw, and controls the output current in accordance with the current command value Iref with respect to the fuel cell 11. Therefore, the reduction of the output voltage of the fuel cell 11 caused by lack of air supply amount is suppressed, and the current according to a request is extracted from the fuel cell 11.

Further, the ECU 10 performs the changing-suppression processing for reducing the changing width of the acceptable value Ialw when the condition that the changing width of the current command value Iref during a predetermined time is equal to or less than the predetermined value W and the difference between the current command value Iref and the acceptable value Ialw is equal to or less than the predetermined value Dref continues for a predetermined period. Therefore, the changing width of the acceptable value Ialw during the predetermined time is reduced, when a command value of the speed of the vehicle is constant and the acceptable value Ialw fluctuates in accordance with the measured value.

The fuel cell 11 outputs a current to the motor M for driving the vehicle. Therefore, when the changing width of the acceptable value Ialw is reduced, the fluctuation of the driving torque of the motor M is reduced.

The control method of the fuel cell system 1 of the embodiment includes the following steps.

(1) a step of supplying oxygen to the fuel cell 11 from the air compressor 12.

(2) a step of measuring the flow amount of the air from the air compressor 12 by the flow meter 13.

(3) a step of outputting the current from the fuel cell 11 to the motor M for driving the vehicle.

(4) a step of feed-back controlling the air compressor 12 such that the measured value of the flow meter 13 converges toward the target value.

(5) a step of determining the acceptable value Ialw in accordance with the measured value.

(6) a step of restricting the output current of the fuel cell 11 to the acceptable value Ialw or less and controlling the output current in accordance with the current command value Iref with respect to the fuel cell 11.

(7) a step of performing the changing-suppression processing for reducing the changing width of the acceptable value Ialw during a predetermined time when the condition that the changing width of the current command value Iref during the predetermined time is equal to or less than the predetermined value W and the difference between the current command value Iref and the acceptable value Ialw is equal to or less than the predetermined value Dref continues for a predetermined period.

A control method of the fuel cell system 1 has the same features as the fuel cell system 1. Therefore, the control method has the same function and the same effect as the mentioned structure.

Although some embodiments of the present invention have been described in detail, the present invention is not limited to the specific embodiments but may be varied or changed within the scope of the present invention as claimed.

What is claimed is:

1. A fuel cell system comprising;
a fuel cell that outputs a current to a motor for driving a vehicle;
a supply unit that supplies oxidant gas to the fuel cell;
a flow-amount measurement unit that measures a flow amount of the oxidant gas from the supply unit; and
a controller programmed to feed-back controls the supply unit such that a measured flow-amount value of the flow-amount measurement unit converges toward a target flow-amount value, wherein:
the controller programmed to determine an upper limit value in accordance with the measured flow-amount value;
the controller programmed to restrict the current output by the fuel cell to the upper limit value or less, and to control the current in accordance with a requested current value of the fuel cell; and
the controller programmed to perform a reducing process for reducing an amplitude of the upper limit value during a predetermined time, when a condition continues for a predetermined period, the condition including that a change of the requested current value during the predetermined time is equal to or less than a first predetermined value and a difference between the requested current value and the upper limit value is equal to or less than a second predetermined value.

2. The fuel cell system as claimed in claim 1, wherein the controller programmed to perform the reducing process in which the upper limit value at a starting of the reducing process is used as an initial value.

3. The fuel cell system as claimed in claim 1, wherein the controller programmed to perform the reducing process for reducing the amplitude of the upper limit value during the predetermined time when the condition continues for the predetermined period, the condition including that the change of the requested current value during the predetermined time is equal to or less than the first predetermined value, the difference between the requested current value and the upper limit value is equal to or less than the second predetermined value, the measured flow-amount value is larger than a third predetermined value, and the requested current value is equal to or more than a fourth predetermined value.

4. The fuel cell system as claimed in claim 1, wherein in the reducing process, the controller programmed to restrict the current output by the fuel cell to the upper limit value after the reducing process or less when the upper limit value after the reducing process is equal to or less than a value in which a predetermined value is added to the upper limit value before the reducing process and programmed to restrict the current output by the fuel cell to or less than the value in which the predetermined value is added to the upper limit value before the reducing process when the upper limit value after the reducing process is larger than the value in which the predetermined value is added to the upper limit value before the reducing process.

5. A control method of a fuel cell system, the method comprising:
supplying oxidant gas to a fuel cell from a supply unit;
measuring a flow amount of the oxidant gas from the supply unit by a flow-amount measurement unit;
outputting a current from the fuel cell to a motor for driving a vehicle;
feed-back controlling the supply unit such that a measured flow-amount value of the flow-amount measurement unit converges toward a target flow-amount value;

determining an acceptable current value in accordance with the measured flow-amount value;

restricting the current output by the fuel cell to the acceptable current value or less and controlling the current in accordance with a requested current value of the fuel cell; and performing a changing-suppression processing for reducing a changing width of the acceptable current value during a predetermined time, when a condition continues for a predetermined period, the condition including that a changing width of the requested current value during the predetermined time is equal to a first predetermined value or less and a difference between the requested current value and the acceptable current value is equal to or less than a second predetermined value.

* * * * *